(12) United States Patent
Vasireddy et al.

(10) Patent No.: US 11,681,501 B2
(45) Date of Patent: Jun. 20, 2023

(54) ARTIFICIAL INTELLIGENCE ENABLED OPEN SOURCE PROJECT ENABLER AND RECOMMENDATION PLATFORM

(71) Applicant: INTERNATIONAL BUSINESS MACHINES CORPORATION, Armonk, NY (US)

(72) Inventors: Vamsi Vasireddy, Visakhapatnam (IN); Subir Ghosh, Visakhapatnam (IN); Shailendra Moyal, Pune (IN); Venkata Vara Prasad Karri, Visakhapatnam (IN); Akash U. Dhoot, Pune (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 94 days.

(21) Appl. No.: 17/302,702

(22) Filed: May 11, 2021

(65) Prior Publication Data

US 2022/0365756 A1 Nov. 17, 2022

(51) Int. Cl.
*G06F 21/57* (2013.01)
*G06F 8/10* (2018.01)
*G06F 8/73* (2018.01)
*G06Q 10/101* (2023.01)
*G06N 5/022* (2023.01)
*G06F 18/214* (2023.01)
(Continued)

(52) U.S. Cl.
CPC ............. *G06F 8/10* (2013.01); *G06F 8/73* (2013.01); *G06F 18/214* (2023.01); *G06N 5/022* (2013.01); *G06Q 10/101* (2013.01);

*G06F 8/60* (2013.01); *G06F 8/71* (2013.01); *G06F 21/105* (2013.01); *G06Q 10/06311* (2013.01)

(58) Field of Classification Search
CPC ..... G06F 8/10; G06F 8/73; G06F 8/71; G06F 8/60; G06F 21/105; G06K 9/6256; G06N 5/022; G06Q 10/101; G06Q 10/06311
See application file for complete search history.

(56) References Cited

U.S. PATENT DOCUMENTS

| 10,664,877 B1 | 5/2020 | Feng | |
| 2015/0193482 A1* | 7/2015 | Kaushansky | ........... G06F 16/34 707/741 |

(Continued)

OTHER PUBLICATIONS

Yogesh Singh et al., Prediction of Fault-Prone Software Modules using Statistical and Machine Learning Method, 2010, [Retrieved on Apr. 10, 2023], Retrieved from the internet: <URL: https://citeseerx.ist.psu.edu/document_repid=rep1&type=pdf&doi=912fdd2e16db25733462caa59ce7f4eaaaca5319> 8 Pages (8-15) (Year: 2010).*

(Continued)

*Primary Examiner* — Anibal Rivera
(74) *Attorney, Agent, or Firm* — Elliot J. Shine

(57) ABSTRACT

A method, computer system, and a computer program product for project development in a collaborative platform is provided. The present invention may include identifying one or more features of an open source project. The present invention may include analyzing the one or more features of the open source project and assigning a sentiment to each of the one or more features. The present invention may include generating a requirement mapping for the open source project, wherein the requirement mapping is a series of the one or more features.

20 Claims, 5 Drawing Sheets

(51) Int. Cl.
  *G06Q 10/0631* (2023.01)
  *G06F 8/71* (2018.01)
  *G06F 21/10* (2013.01)
  *G06F 8/60* (2018.01)

(56) References Cited

U.S. PATENT DOCUMENTS

| | | | |
|---|---|---|---|
| 2016/0202972 A1* | 7/2016 | Sass | G06F 21/10 |
| | | | 717/121 |
| 2016/0300252 A1* | 10/2016 | Frank | G06F 16/24578 |
| 2019/0122155 A1 | 4/2019 | Irazabal | |
| 2019/0303623 A1 | 10/2019 | Reddy | |
| 2020/0007513 A1* | 1/2020 | Gleichauf | G06F 8/65 |
| 2021/0397418 A1* | 12/2021 | Nikumb | G06F 8/36 |
| 2022/0129561 A1* | 4/2022 | Shivanna | G06F 21/57 |

OTHER PUBLICATIONS

Chen, et al., "Decentralized Governance of Blockchain Platforms," Stevens Institute of Technology School of Business Research Paper, Mar. 12, 2020, 60 pages, Retrieved from the Internet: <URL: https://ssm.com/abstract=3553382>.

Mell et al., "The NIST Definition of Cloud Computing", National Institute of Standards and Technology, Special Publication 800-145, Sep. 2011, 7 pages.

* cited by examiner

ARTIFICIAL INTELLIGENCE ENABLED OPEN SOURCE PROJECT ENABLER AND RECOMMENDATION PLATFORM

BACKGROUND

The present invention relates generally to the field of computing, and more particularly to Artificial Intelligence (AI).

An open source project may be a project that allows for anybody to use, study, modify and distribute the open source project. These permissions may be enforced through an open source license. An open source license may be a type of license for computer software and other products that may allow the source code, blueprint or design to be used, modified and/or shared under defined terms and conditions. An open source project may receive contributions from a wide range of individuals or teams of individuals throughout its development. The permissions of an open source project may result in a slower development pace and the project may become devoid of a common goal and/or direction. Additionally, similar open source projects may be developed in parallel which thwart progress.

Furthermore, it may be difficult connecting different open source projects and the individuals working on those projects.

SUMMARY

Embodiments of the present invention disclose a method, computer system, and a computer program product for project development. The present invention may include identifying one or more features of an open source project. The present invention may include analyzing the one or more features of the open source project and assigning a sentiment to each of the one or more features. The present invention may include generating a requirement mapping for the open source project, wherein the requirement mapping is a series of the one or more features.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
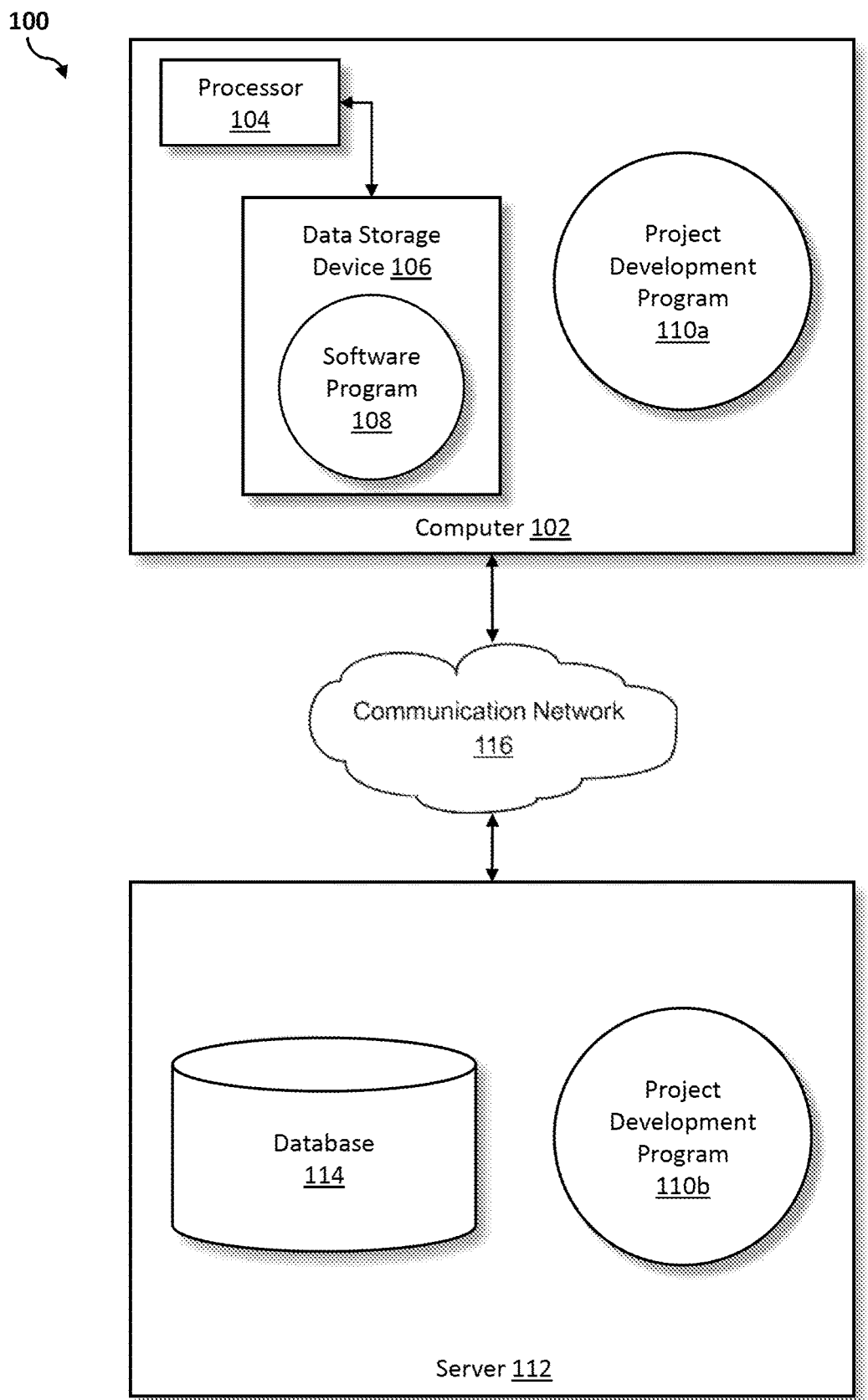
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for project development. As such, the present embodiment has the capacity to improve the technical field of Artificial Intelligence (AI) by enabling intelligent recommendations between and amongst open source projects. More specifically, the present invention may include identifying one or more features of an open source project. The present invention may include analyzing the one or more features of the open source project and assigning a sentiment to each of the one or more features. The present invention may include generating a requirement mapping for the open source project, wherein the requirement mapping is a series of the one or more features.

As described previously, an open source project may be a project that allows for anybody to use, study, modify and distribute the open source project. These permissions may be enforced through an open source license. An open source license may be a type of license for computer software and other products that may allow the source code, blueprint or design to be used, modified and/or shared under defined terms and conditions. An open source project may receive contributions from a wide range of individuals or teams of individuals throughout its development. The permissions of an open source project may result in a slower development pace and the project may become devoid of a common goal and/or direction. Additionally, similar open source projects may be developed in parallel which thwart progress.

Furthermore, it may be difficult connecting different open source projects and the individuals working on those projects.

Therefore, it may be advantageous to, among other things, identify one or more features of an open source project, analyze the one or more features of the open source project and assigning a sentiment to each of the one or more features, and generate a requirement mapping for the open source project, wherein the requirement mapping is a series of the one or more features.

According to at least one embodiment, the present invention may improve open source software initiatives by recommending at least other users, other projects, and code to the developers of an open source project based on a requirement mapping.

According to at least one embodiment, the present invention may improve governance and collaboration between open source projects by utilizing a blockchain governance structure.

According to at least one embodiment, the present invention may improve open source projects by identifying bottlenecks within the requirement mapping.

According to at least one embodiment, the present invention may improve the direction of open source projects by integrating market requirements from potential customers.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a project development program 110a. The networked computer environment 100 may also include a server 112 that is enabled to run a project development program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 3, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the project development program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the project development program 110a, 110b (respectively) to integrate open source projects on a collaborative platform using Artificial Intelligence (AI) to improve collaboration efforts, bottlenecks, and networking between developers. In various embodiments of the invention, project development program 110, may execute locally on client computer 102 as a plug-in to an interne browser, as a dedicated software application, or in another appropriate manner as would be understood by one of skill in the art. In alternative embodiments, the project development program 110 may execute on the server computer 112. The project development method is explained in more detail below with respect to FIG. 2.

Figure 2:
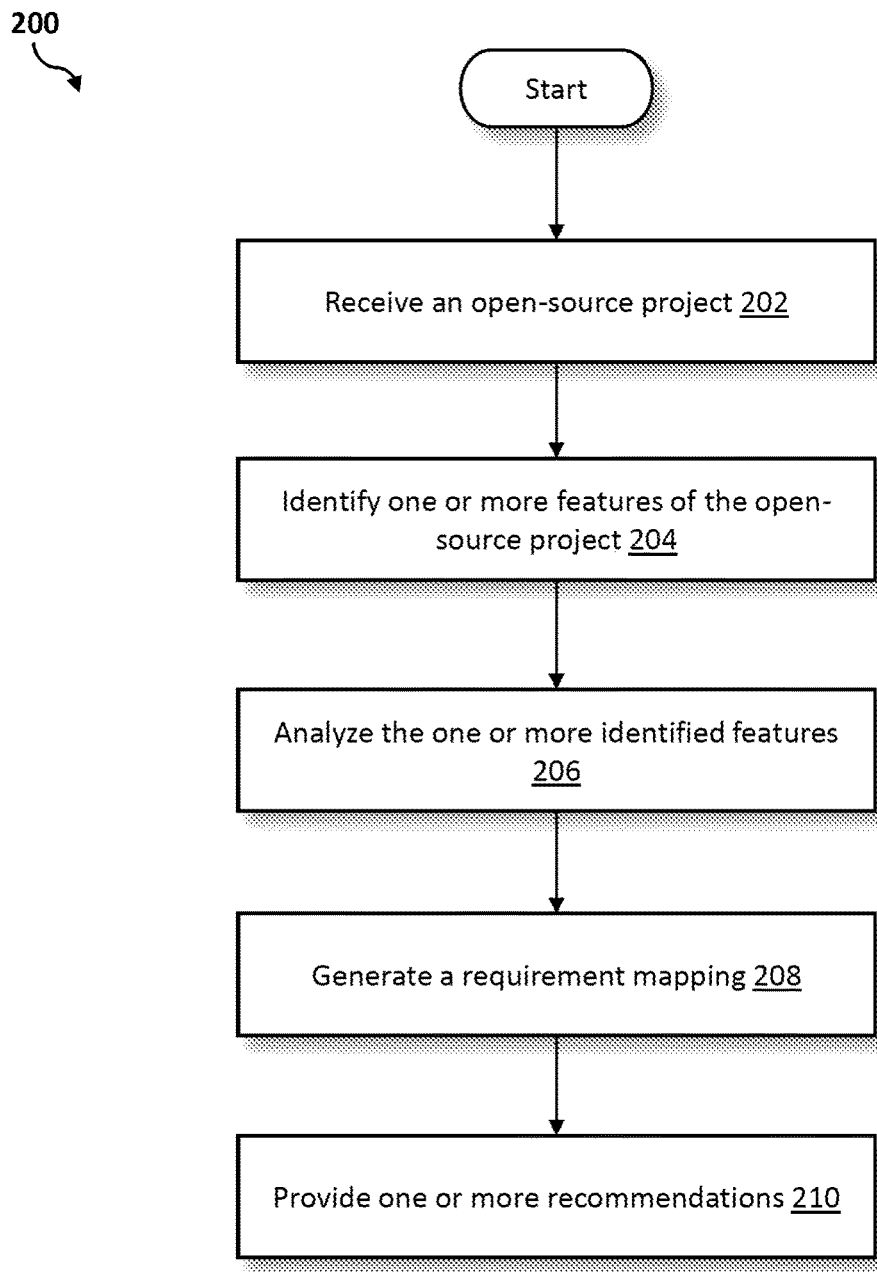
FIG. 2 is an operational flowchart illustrating a process for project development according to at least one embodiment.

Referring now to FIG. 2, an operational flowchart illustrating the exemplary project development process 200 used by the project development program 110a and 110b (hereinafter project development program 110) according to at least one embodiment is depicted.

At 202, the project development program 110 receives an open source project. The project development program 110 may receive one or more open source projects from one or more developers. The one or more developers may upload source code of the open source project to a collaborative platform. The collaborative platform may be an Artificial Intelligence (AI) and/or Blockchain enabled platform, as will be explained in more detail below.

The collaborative platform may have one or more users. The one or more users may include developers and businesses, amongst other users. Each user may have a profile on the collaborative platform. A developer profile may include, but is not limited to including, previous open source project contributions, proficiencies in different programming languages, areas of expertise/interest, amongst others. A business profile may include, but is not limited to including, industry, open source project interest/requirements, funding abilities, amongst others. The profile of a user may be updated automatically based on the user's engagement with open source projects on the collaborative platform.

At 204, the project development program 110 identifies one or more features of the open source project. The project development program 110 may identify features of the open source project from one or more sources, including, but not limited to including, source code, source code-repository, source code comments, source code identifiers, engagement on the collaborative platform, direct input from developers, communications between developers, amongst other sources.

The project development program 110 may receive input from the one or more developers of the open source project. The project development program 110 may receive input from the one or more developers through the collaborative platform. The collaborative platform may be presented to the one or more developers by the project development program 110 through at least an internet browser and/or dedicated software application. The project development program 110 may prompt the one or more developers to provide input on the open source project at least following the uploading of the open source project to the collaborative platform. Input may include, but is not limited to including, open source project features, a programming language used, any open source project goals, an industry in which the open source project is to be utilized, open source project requirements, applicable open source licenses, developers involved in the open source project, open source project funding details, amongst others. The project development program 110 may leverage the input received from one or more developers in identifying the one or more features of the open source project.

The project development program 110 may utilize a code-to-feature application programming interface (API) in order to identify the one or more features of the open source project. The code-to-feature API may utilize one or more feature location techniques, including at least, dynamic, static, and textual. A dynamic analysis may refer to examining a software system's execution, and may be utilized when features of the open source project may be observed during runtime. A static analysis may examine structural information such as control or data flow analysis. Textual approaches to feature location may analyze the words used in the source code.

The code-to-feature API may utilize one or more textual approaches in identifying one or more features directly from the source code. The code-to-feature API may leverage at least the source code comments (e.g., block comments, line comments), source code identifiers, the source code repository, developer input, platform engagement, amongst other sources in identifying the one or more features. The code-to-feature API may utilize textual analysis techniques, such as, but not limited to pattern matching, Information Retrieval (IR), and Natural Language Processing (NLP) in identifying the one or more features directly from the source code of the open source project. Pattern matching may involve a textual search of the source code using a utility, such as a command-line utility for searching the source code text. Information Retrieval techniques may utilize statistical methods, such as, but not limited to, Latent Semantic Indexing (LSI), Latent Dirichlet Allocation (LDA), and Vector Space Model (VSM), to find a feature's relevant code by analyzing and retrieving identifiers and comments similar to a query. The recommendation program 110 may feed the code-to-feature API query terms in which to utilize Information Retrieval techniques based on at least input received from the developers. The code-to-feature API may also utilize an NLP machine learning model. The NLP machine learning model may be trained based on a knowledge corpus (e.g., database 114). The knowledge corpus may be maintained by the project development program 110, storing an identified feature and the corresponding code. The code-to-feature API may leverage the developer input and the NLP machine learning model to identify the one or more features of the source code. For example, the code-to-feature API may specify the knowledge corpus (e.g., database 114) to the coding language input by developers.

The project development program 110 may identify features of the open source project from collaborative platform engagement. The collaborative platform may enable users to review uploaded open source projects and provide feedback. The users of the collaborative platform may provide feedback using at least comments, likes, audio commentary, video media, shares, on the collaborative platform. The project development program 110 may also utilize speech to text conversion APIs, emotion analyzer to process text, as well as other methods to identify features of the open source project based on the collaborative platform engagement.

The project development program 110 may identify features of the open source project utilizing a source code repository. A source code repository may be one or more files or documentation associated with the open source project. The one or more developers of the open source project may upload the source code repository to the collaborative platform. The source code repository may include, but is not limited to including, documentation, web pages, code revisions, version history, mailing lists, email communications, amongst other files and documentation.

The project development program 110 may store the identified features of the open source project and the corresponding code in the knowledge corpus (e.g., database 114). The project development program 110 may store the identified features of the open source project based on a confidence score. The development program 110 may store the identified features of the open source project automatically if the identified feature is above a confidence score. The development program 110 may request verification from the developers of the open source project if the indirectly identified feature is below the confidence score. The project development program 110 may utilize the verification responses from the developers of the open source project as input for the code-to-feature API and to re-train the NLP machine learning model.

As the project development program 110 continues to train the NLP machine learning model the code-to-feature API may be reversed. The project development program 110 may utilize a feature-to-code API. The feature to code API may utilize the knowledge corpus (e.g., database 114) as a training data set. The project development program 110 may reverse the code-to-feature API based on at least the verification responses from the developers and the confidence score for the identified features.

For example, Team A, comprised of Developers A, B, and C, may be working on Open Source Project A. Developer B from Team A may upload Open Source Project A to the collaborative platform. Developer B may provide input only with respect to the coding language and other Developers. The project development program 110 may utilize the code-to-feature API in determining the one or more features of Open Source Project A. The project development program 110 may automatically store Feature 1 and 2, as well as the corresponding code, in the knowledge corpus (e.g., database 114). The project development program 110 may request verification with respect to Feature 3 from each of the one or more developers because the confidence score for identified Feature 3 is below the confidence score threshold.

At 206, the project development program 110 analyzes the one or more identified features of the open source project. The project development program 110 may utilize at least the NLP techniques, such as those implemented in IBM Watson® (IBM Watson, Ask Watson®, and all Watson-based trademarks are trademarks or registered trademarks of International Business Machines Corporation in the United States, and/or other countries), IBM Watson® Tone Analyzer, sentiment analysis, amongst others, in analyzing the one or more identified features of the open source project.

The project development program 110 may analyze the open source project. The project development program 110 may analyze the open source project by assigning a sentiment to the one or more identified. The project development program 110 may assign a sentiment (e.g., opinion, feeling, or emotion) to each of the identified features on a polarity scale. The polarity scale may include a range of at least positive, negative, or neutral.

The project development program 110 may utilize engagement on the collaborative platform in assigning a sentiment to each of the identified features. The project development program 110 may utilize both qualitative and quantitative of collaborative platform engagement in assigning a sentiment to an identified feature. For example, the project development program 110 may utilize the number of likes, shares, comments, while also utilizing the profiles of the user engaging with the identified features. The project development program 110 may weight the expertise, industry experience, previous open source projects, collaborative platform engagement, of the users engaging with the one or more features.

The project development program 110 may also utilize other sources in assigning a sent. For example, project development program 110 may utilize informal tags in comments such as "bug" in a source code section to negatively weight the feature corresponding to that source code.

Continuing with the above example, Open Source Project A may be a video editor. The project development program 110 utilizing at least the code-to-feature API and the knowledge corpus (e.g., database 114) identified numerous features, including at least, color adjustments, adding text, noise filtering, amongst others. Based on comments and likes on the collaborative platform 110 the project development program 110 assigned a positive sentiment to color adjustments. The positive sentiment was appropriated even more weighting based on comments from Developers D and E, both of whom have expertise in video editing and have worked on numerous successful open source projects in the field. Based on an email exchange between Developer A and Developer B, as well as a "FIXME" informal tag in the source code comments the project development program 110 assigned a negative sentiment to noise filtering. The noise filtering feature may be the only feature with a negative sentiment. The project development program 110 may understand that Open Source Project A is close to completion, noise filtering is a bottleneck, and the video editor would have high market utility.

At 208, the project development program 110 generates a requirement mapping for the open source project. The requirement mapping may be a series of identified features within the open source project. The series may illustrate the flow and overall functionality of the open source project. The requirement mapping may be utilized to display details of the open source project such as, but not limited to, flow of the open source project, progress in open source project development, bottlenecks in open source project development, feature classifications, classifications of identified features, amongst other details. The requirement mapping may include a corresponding sentiment for each of the one or more identified features of the open source project.

The project development program 110 may classify each of the identified features of the open source project utilizing key words. The project development program 110 may determine one or more key words for each of the identified features of the open source project. The project development program 110 may determine the one or more key words for each of the identified features utilizing one or more word vectorization techniques. The project development program 110 may determine the one or more key words based on a similarity threshold.

The project development program 110 may classify each of the one or more key words associated with each identified feature as either functional requirements, non-functional requirements, or other requirements. The project development program 110 may use a machine learning model to classify the one or more key words. The machine learning model may utilize one or more classification algorithms, such as, but not limited to, naïve bayes classifier, k-nearest neighbors, decision tree, random forest, amongst others.

The key words may be ranked within the classification. The project development program 110 may rank the key words within the classification based on the sentiment analysis of the open source project. The project development program may flag key words within the classification based on the sentiment analysis of the identified feature associated with the key word.

The project development program 110 may utilize the requirement mapping in determining a value of the open source project relative to one or more other open source projects on the collaborative platform. The project development program 110 may utilize the value of the open source project to weight the open source project. Weighting the open source project may rank the open source project higher relative to the one or more other open source projects on the collaborative platform. As will be explained in more detail below, the project development program 110 may also utilize a market requirement in determining the value of the open source project.

Continuing with the above example, the project development program 110 may generate key words for each identified feature of Open Source Project A. The project development program 110 may have identified 15 Features, with the noise filtering feature being Feature 13. The project development program may generate key words such as "sound" "noise cancellation" "noise filtering" "noise reduction software" "audio editor". The machine learning model may classify each of these key words as a functional requirement. Within the classification the generated key words may be ranked higher relative to other open source projects because of the high level of engagement by other users through the collaborative platform with Open Source Project A. As will be explained in more detail below, the ranking within the classification may be utilized to provide one or more recommendations. The requirement mapping for Open Source Project A may at least provide users of the collaborative platform details with respect to the progress of Open Source Project A, as well the bottleneck with respect to Feature 13 in open source project development. The project development program 110 may determine that Open Source Project A has a high value relative to the one or more other video editing open source projects. As will be explained below, the project development program 110 utilize the value of Open Source Project A in providing the one or more recommendations.

At 210, the project development program 110 provides one or more recommendations. The project development program 110 may provide one or more recommendations to the developers of the open source project based on the requirement mapping of the open source project. The project development program 110 may utilize the requirement mapping of the open source project to identify one or more other open source projects based on the requirement mapping of the one or more other open source projects. Recommendations may include, but are not limited to including, previously used code scripts for negative sentiment features, developer user profiles with experience in the negative sentiment features, compatible open source projects, amongst others.

The project development program 110 may provide the one or more recommendations to the users of the collaborative platform utilizing one or more contact methods, including, but not limited to, an integrated development environment (IDE), notifications to one or more contact methods, alerts through the collaborative platform, amongst others. The integrated development environment may be integrated with the collaborative platform. The one or more contact methods may be the contact methods of a user profile, such as, but not limited to, email, phone numbers, communication platforms, amongst others. A customize the method of receiving the one or more recommendations through his or her user profile on the collaborative platform. The project development program 110 may display notifications of the one or more recommendations generated by the project development program 110 using the collaborative platform.

The project development program 110 may recommend a collaboration between two or more open source projects. The project development program 110 may utilize the requirement mapping of the open source project to identify one or more other open source projects based on a matching with the requirement mapping of the one or more other open source projects. The project development program 110 may match the requirement mapping of the open source project with the one or more other open source projects where the other open source projects have a positive sentiment on identified features in which the requirement mapping of the open source project has a negative sentiment. The project development program 110 may match the requirement mapping of the open source project with the one or more other open source projects where the other open source projects include one or more identified features not present in the requirement mapping of the open source project. The one or more identified features not present in the requirement mapping of the open source project may be part of a market requirement. The project development program 110 may also utilize any applicable open source licenses and/or market requirements. A market requirement may be identified based upon at least, the open source project requirements of a business profile, a web crawler utilized by the project development program 110, searches performed on the collaborative platform, direct requests from clients, amongst others. The market requirement may require two or more features that no single open source project on the collaborative platform fulfills alone, but combinations of one or more open source projects may fulfill. The project development program 110 may recommend the collaboration between the two or more projects based on at least the market requirement, open source licenses, determined value of each open source project, amongst other factors. The project development program 110 may recommend the collaboration between two or more open source projects with corresponding open source licenses. Corresponding open source licenses may refer to compatible open source licenses such that the two or more open source projects may collaborate without violation of any applicable open source license.

The project development program 110 utilize market requirement trends in providing the one or more recommendations. The project development program 110 may classify market requirements utilizing at least a Natural Language Classifier model and/or Natural Language Understanding model. The project development program 110 may utilize one or more statistical models, such as but not limited to, a Mann-Kendall score and/or a Poisson Distribution Model. The project development program 110 may combine one or more statistical measure, such as, but not limited to, a sustained increase in count, a sustained decrease in count, an unexpectedly large or small count given preceding counts, a count less or greater than the average count, a defined start and end, an increasing trend (e.g., the end-count is greater than the start-count), a decreasing trend (e.g., the end-count is less than the start-count). The project development program 110 may provide the one or more recommendations to users based on the requirement mapping of the open source project and the market requirement trends. For example, the project development program 110 may provide one or more recommendations to the developers of the open source project directing the open source project towards an uptrend market requirement as opposed to a downtrend market requirement.

The project development program 110 may utilize a feature-to-code API to provide one or more recommendations based on identified features with a negative sentiment analysis. The feature-to-code API may utilize the programming language of the open source project as well as the one or more key words generated for the identified features with the negative sentiment analysis to search the knowledge corpus (e.g., database) for code language. The project development program 110 may recommend one or more previously used code scripts for each negative sentiment feature of the open source project.

The project development program 110 may recommend one or more users based on the requirement mapping. The project development program 110 may recommend the one or more users based on the identified features with negative sentiment of the requirement mapping. The project development program 110 may search the collaborative platform using the one or more key words generated for the identified features with negative sentiment. The project development program 110 may generate a list of the one or more users with expertise in the identified features with negative sentiment. The project development program 110 may rank the list according to compatibility. The project development program 110 may rank the one or users based on at least the expertise of the user, experience of the user, sentiment analysis of the open source project, engagement level of the open source project on the collaborative, amongst other factors. For example, the project development program 110 may recommend a user with less experience for an open source project in which the project development program 110 determined a lower value compared to an open source project determined to have a high value. The project development program 110 may recommend a user with a high level of expertise to the open source project determined to have the high value.

The project development program 110 may recommend the identified features with negative sentiment to users through the collaborative platform. Each user of the collaborative platform may be able to search key words through the collaborative platform. The key words searched may displayed by the classification. The search may present each open source project associated with the key word. Each open source project associated with the key word may be ranked based on the sentiment analysis of the open source project.

The project development program 110 may continuously monitor each open source project uploaded to the collaborative platform. The project development program 110 may continuously monitor each open source project uploaded to the collaborative platform by tracking one or more usage metrics, the one or more usage metrics may include, but are not limited to including, downloads, reported issues, enhancements, engagement, contributions, software development principles followed, documentation, delivery models, domain coverage, reusability, completion of market requirements, blockchain governance records, amongst others. The project development program 110 may utilize the one or more usage metrics to create one or more cognitive packages. The one or more cognitive packages would bundle code snippets and/or open source packages according to features. The project development program 110 may store the one or more cognitive packages in the knowledge corpus (e.g., database 114). The project development program 110 may utilize the one or more cognitive packages in providing one or more recommendations to users of the collaborative platform.

The collaborative platform may provide a governance structure for the open source projects, including at least, new open source projects, existing open source projects, collaboration open source projects, amongst others. As described above with respect to 202, the governance structure of the collaborative platform may utilize blockchain technology.

The blockchain governance structure may enable each developer of an open source project to act as a network agent with the ability to validate on chain code. The first block of the blockchain governance structure may be formed upon the inception of a new open source project, agreement between developers of an existing open source project, or between two or more open source projects agreeing to collaborate. The agreed upon terms of the open source project may embedded in computer code managed by the blockchain governance structure utilizing one or more smart contracts. The one or more smart contracts may be self-enforcing agreements between developers of the open source project. The computer code may contain a set of rules under which the one or more developers of the open source project agree to interact with each other. The project development program 110 may replicate the code of the one or more smart contracts across multiple nodes of the blockchain governance structure, as each new block is added to the blockchain governance structure, the code may, in effect, be executed. The one or more developers of the open source project may indicate that parameters have been met in accordance with the agreement which may execute the code corresponding to those parameters. The first block may include the open source project vision, the open source project vision may include, processes, tools, individuals or developers, open source licenses, amongst others. The blockchain governance structure may ensure open source license compliance between one or more open source projects. The blockchain governance structure may enable the tracking of open source project progress with each block being validated by each network agent.

The project development program 110 may also utilize the blockchain governance structure to manage agreements between two or more users of the collaborative platform. For example, a business profile may be looking to fund an open source project to fulfill a market requirement. The project development program 110 may allow the business profile to enter into a smart contract with one or more developer profiles. As the one or more developers meet parameters of the smart contract additional funds may be automatically released to the developers. The project development program 110 may smart contracts executed through the blockchain governance structure in providing the one or more recommendations to the users of the collaborative platform.

The blockchain governance structure may additionally enable the project development program 110 to track reusability of code in comparable open source projects, automatically update a user's profile with verifiable insights recorded on the blockchain, amongst other uses.

It may be appreciated that FIG. 2 provides only an illustration of one embodiment and do not imply any limitations with regard to how different embodiments may be implemented. Many modifications to the depicted embodiment(s) may be made based on design and implementation requirements.

Figure 3:
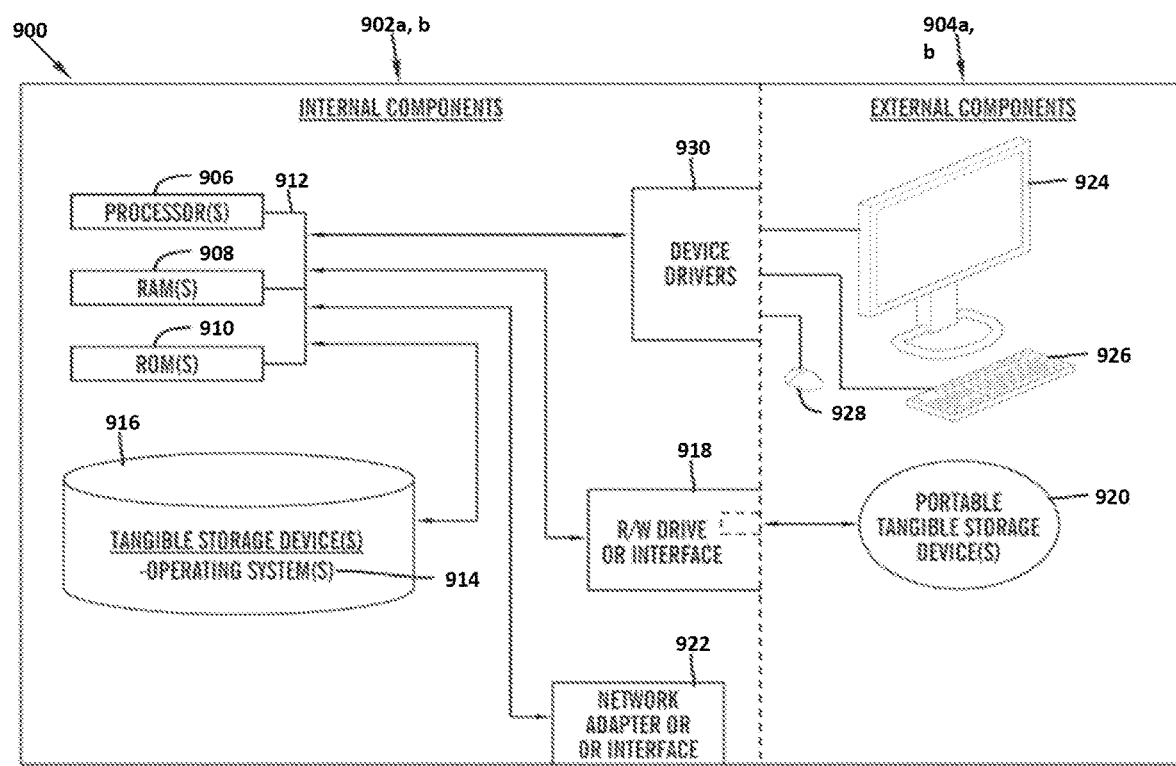
FIG. 3 is a block diagram of internal and external components of computers and servers depicted in FIG. 1 according to at least one embodiment.

FIG. 3 is a block diagram 900 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 3. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the project development program 110a in client computer 102, and the project development program 110b in network server 112, may be stored on one or more computer-readable tangible storage devices 916 for execution by one or more processors 906 via one or more RAMs 908 (which typically include cache memory). In the embodiment illustrated in FIG. 3, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the project development program 110a and 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the project development program 110a in client computer 102 and the project development program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the project development program 110a in client computer 102 and the project development program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
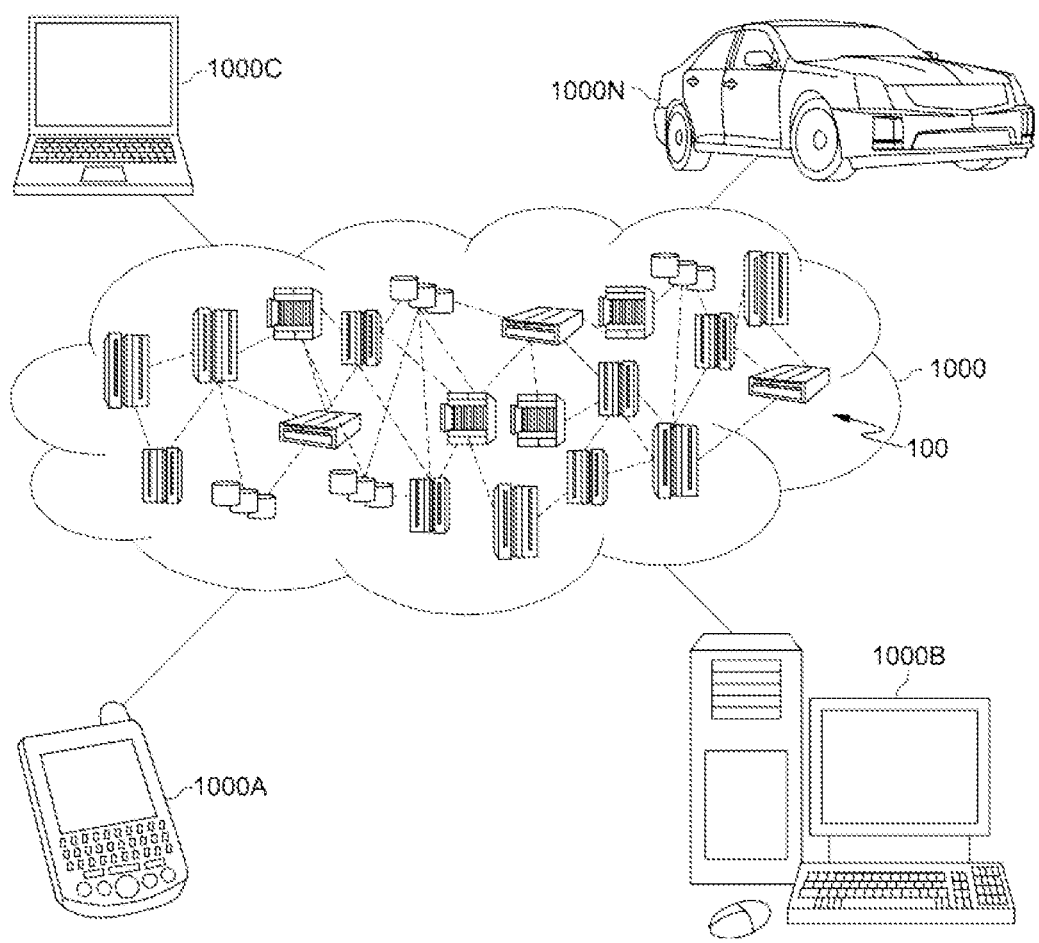
FIG. 4 is a block diagram of an illustrative cloud computing environment including the computer system depicted in FIG. 1, in accordance with an embodiment of the present disclosure.

Referring now to FIG. 4, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 4 are intended to be illustrative only and that computing nodes 100 and cloud computing environment 1000 can communicate with any type of computerized device over any type of network and/or network addressable connection (e.g., using a web browser).

Figure 5:
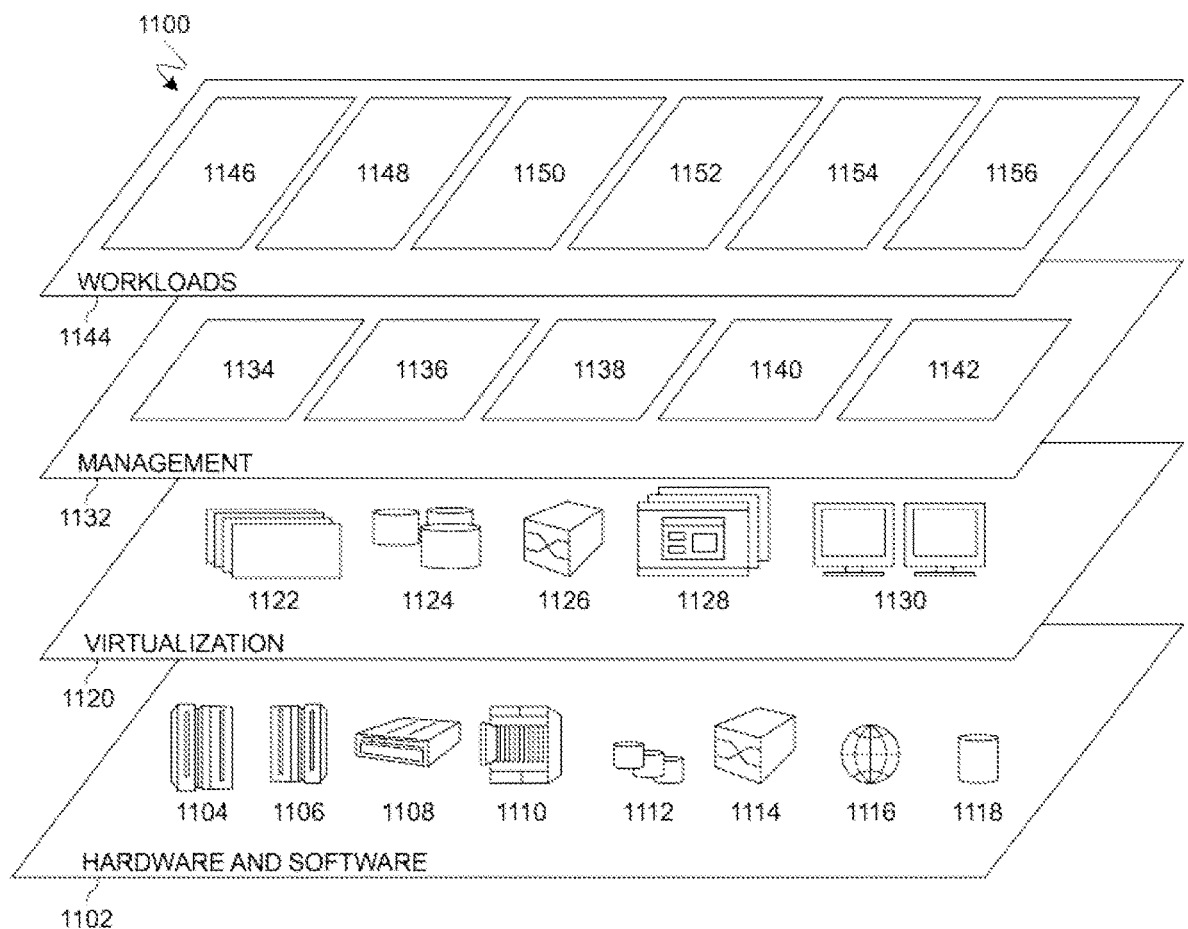
FIG. 5 is a block diagram of functional layers of the illustrative cloud computing environment of FIG. 4, in accordance with an embodiment of the present disclosure.

Referring now to FIG. 5, a set of functional abstraction layers 1100 provided by cloud computing environment 1000 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and project development 1156. A project development program 110a, 110b provides a way to provide intelligent recommendations to open source projects based on the identified features of the source code.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for project development in a collaborative platform, the method comprising:
   identifying one or more features of an open source project;
   analyzing the one or more features of the open source project and assigning a sentiment to each of the one or more features;
   generating a requirement mapping for the open source project, wherein the requirement mapping is a series of the one or more features; and
   providing one or more recommendations based on the requirement mapping, wherein the one or more recommendations includes at least a collaboration between two or more open source projects based on the requirement mapping of the open source project and a requirement mapping of one or more other open source projects.

2. The method of claim 1, wherein the one or more features of the open source project are identified using natural language processing and leveraging input data received from a developer of the open source project.

3. The method of claim 1, wherein providing the one or more recommendations based on the requirement mapping further comprises:
   storing the one or more features and a corresponding source code in a knowledge corpus;
   training a feature-to-code API utilizing the knowledge corpus as a training data set; and
   providing the one or more recommendations each of the one or more features of the requirement mapping with a negative sentiment.

4. The method of claim 1, further comprising:
   displaying the one or more recommendations to a plurality of users associated with the open source project through a collaborative platform, wherein the collaborative platform utilizes a blockchain governance structure, wherein the blockchain governance structure enforces a set of rules between the plurality of users using one or more smart contracts.

5. The method of claim 1, wherein assigning the sentiment to each of the one or more features is based on at least engagement on a collaborative platform, wherein the engagement of the collaborative platform is weighted according to at least an expertise of one or more users engaging with the open source project on the collaborative platform.

6. The method of claim 1, wherein the collaboration between the two or more open source projects fulfills a market requirement and the two or more open source projects include compatible open source licenses.

7. The method of claim 1, wherein providing the one or more recommendations based on the requirement mapping further comprises:
   recommending one or more users of a collaborative platform based on an expertise in the one or more features with a negative sentiment of the requirement mapping.

8. A computer system for project development in a collaborative platform, comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
   identifying one or more features of an open source project;
   analyzing the one or more features of the open source project and assigning a sentiment to each of the one or more features;
   generating a requirement mapping for the open source project, wherein the requirement mapping is a series of the one or more features; and
   providing one or more recommendations based on the requirement mapping, wherein the one or more recommendations includes at least a collaboration between two or more open source projects based on the requirement mapping of the open source project and a requirement mapping of one or more other open source projects.

9. The computer system of claim 8, wherein the one or more features of the open source project are identified using natural language processing and leveraging input data received from a developer of the open source project.

10. The computer system of claim 8, wherein providing the one or more recommendations based on the requirement mapping further comprises:
    storing the one or more features and a corresponding source code in a knowledge corpus;
    training a feature-to-code API utilizing the knowledge corpus as a training data set; and
    providing the one or more recommendations each of the one or more features of the requirement mapping with a negative sentiment.

11. The computer system of claim 8, further comprising:
  displaying the one or more recommendations to a plurality of users associated with the open source project through a collaborative platform, wherein the collaborative platform utilizes a blockchain governance structure, wherein the blockchain governance structure enforces a set of rules between the plurality of users using one or more smart contracts.

12. The computer system of claim 8, wherein providing the one or more recommendations based on the requirement mapping further comprises:
  recommending one or more users of a collaborative platform based on an expertise in the one or more features with a negative sentiment of the requirement mapping.

13. The computer system of claim 8, wherein assigning the sentiment to each of the one or more features is based on at least engagement on a collaborative platform, wherein the engagement of the collaborative platform is weighted according to at least an expertise of one or more users engaging with the open source project on the collaborative platform.

14. The computer system of claim 8, wherein the collaboration between the two or more open source projects fulfills a market requirement and the two or more open source projects include compatible open source licenses.

15. A computer program product for project development in a collaborative platform, comprising:
  one or more non-transitory computer-readable storage media and program instructions stored on at least one of the one or more tangible storage media, the program instructions executable by a processor to cause the processor to perform a method comprising:
  identifying one or more features of an open source project;
  analyzing the one or more features of the open source project and assigning a sentiment to each of the one or more features;
  generating a requirement mapping for the open source project, wherein the requirement mapping is a series of the one or more features; and
  providing one or more recommendations based on the requirement mapping, wherein the one or more recommendations includes at least a collaboration between two or more open source projects based on the requirement mapping of the open source project and a requirement mapping of one or more other open source projects.

16. The computer program product of claim 15, wherein the one or more features of the open source project are identified using natural language processing and leveraging input data received from a developer of the open source project.

17. The computer program product of claim 15, wherein providing the one or more recommendations based on the requirement mapping further comprises:
  storing the one or more features and a corresponding source code in a knowledge corpus;
  training a feature-to-code API utilizing the knowledge corpus as a training data set; and
  providing the one or more recommendations each of the one or more features of the requirement mapping with a negative sentiment.

18. The computer program product of claim 15, further comprising:
  displaying the one or more recommendations to a plurality of users associated with the open source project through a collaborative platform, wherein the collaborative platform utilizes a blockchain governance structure, wherein the blockchain governance structure enforces a set of rules between the plurality of users using one or more smart contracts.

19. The computer program product of claim 15, wherein providing the one or more recommendations based on the requirement mapping further comprises:
  recommending one or more users of a collaborative platform based on an expertise in the one or more features with a negative sentiment of the requirement mapping.

20. The computer program product of claim 15, wherein assigning the sentiment to each of the one or more features is based on at least engagement on a collaborative platform, wherein the engagement of the collaborative platform is weighted according to at least an expertise of one or more users engaging with the open source project on the collaborative platform.

* * * * *